Nov. 4, 1924.
E. R. BURTNETT
INTERNAL COMBUSTION ENGINE
Filed Nov. 22, 1923          2 Sheets-Sheet 1
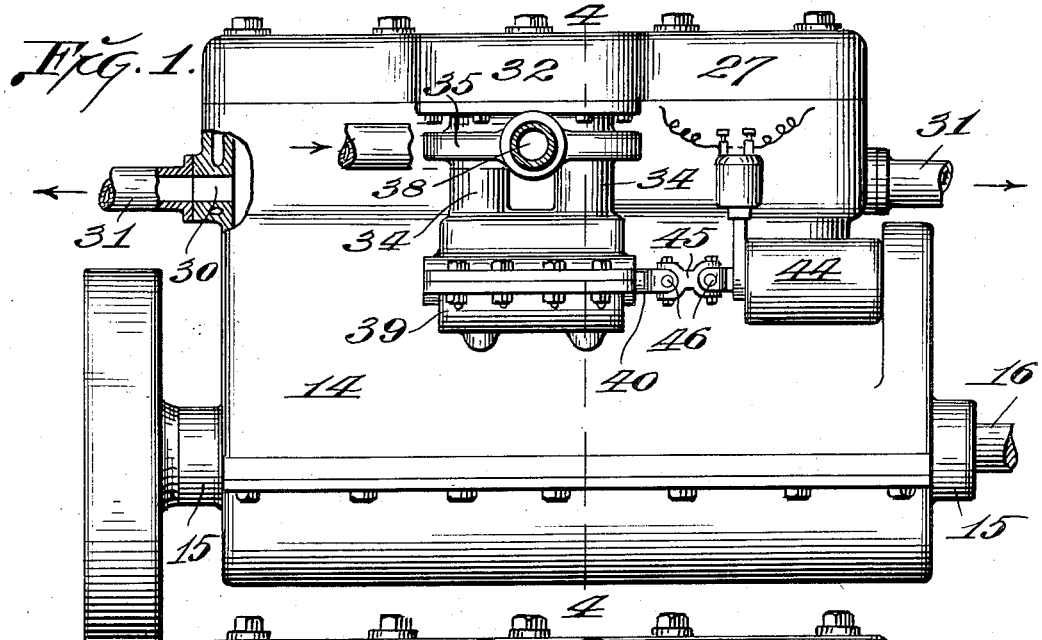
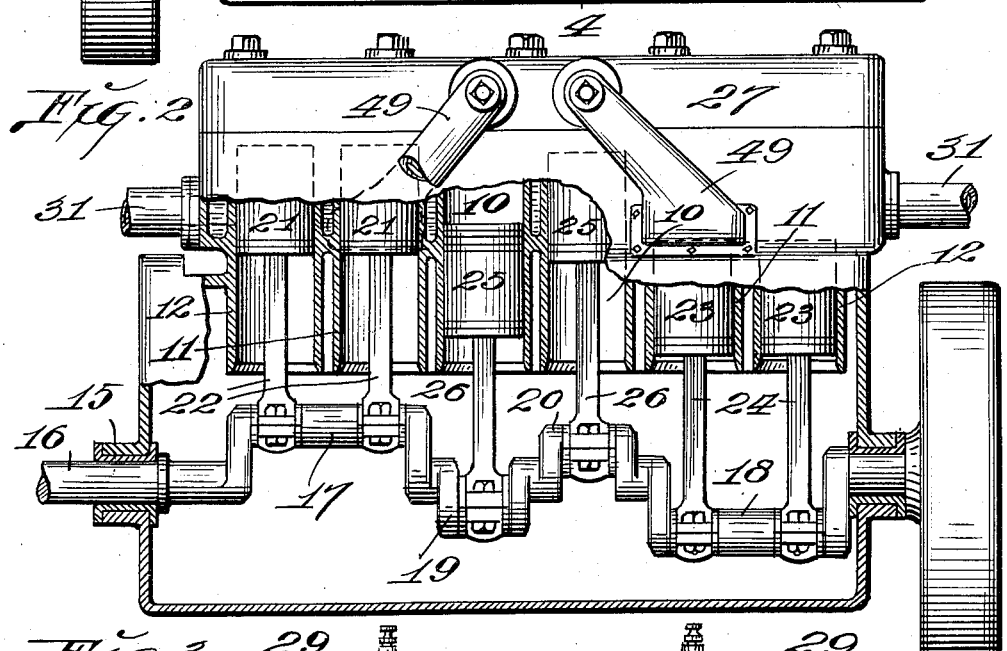
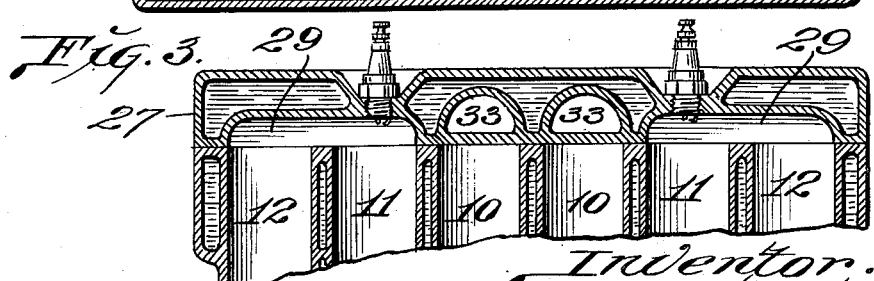
Inventor:—
Everett R. Burtnett.
By Martin P. Smith, Atty

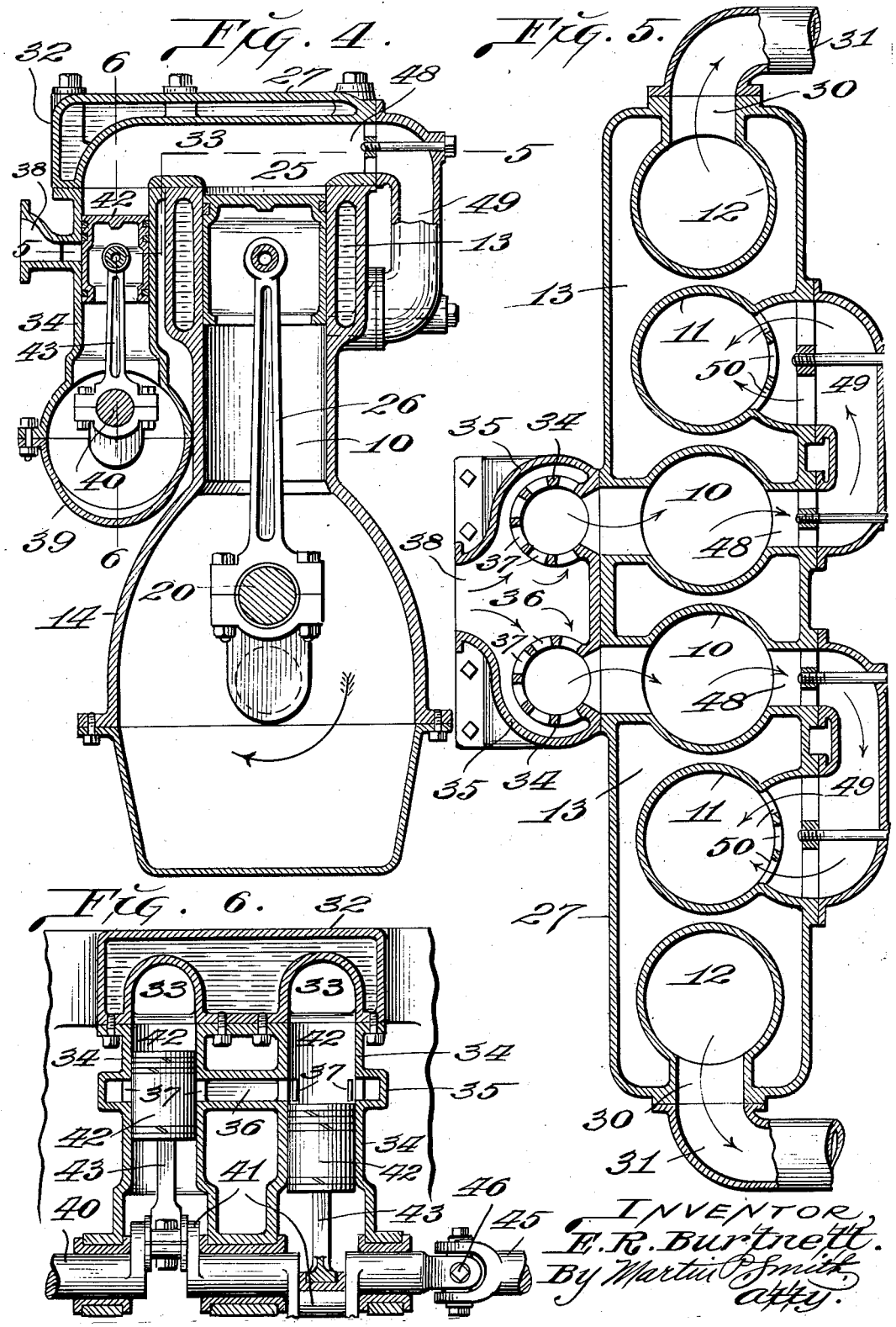

Patented Nov. 4, 1924.

1,514,197

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed November 22, 1923. Serial No. 676,280.

*To all whom it may concern:*

Be it known that I, EVERETT R. BURTNETT, a citizen of the United States, residing at Los Angeles, in the county of Los Angeles and State of California, have invented certain new and useful Improvements in Internal-Combustion Engines, of which the following is a specification.

My invention relates generally to internal combustion engines, and more particularly to an engine of the two stroke cycle type, the principal objects of my invention being to generally improve upon and simplify the construction of the existing types of two stroke cycle engines; to provide an engine having six cylinders arranged in a row, the first and second cylinders from each end functioning as combustion cylinders and being supplied with gaseous fuel from a pair of pumping cylinders that are arranged between the two pairs of combustion cylinders; one pumping cylinder functioning for the adjacent two combustion cylinders. Further, to provide a single crank shaft to which the pistons in all of the pumping and combustion cylinders are connected; to provide a pair of piston valves that are arranged so as to control the supply of gaseous fuel into the pumping cylinders, said piston valves being arranged laterally or to one side of the pumping cylinders; to form the piston valve cylinders in a separate integral structure that is connected to a lateral extension on the central portion of the removable head for the combustion and pumping cylinders; to provide means for actuating the piston valves from a crank shaft that is driven by extraneous means; preferably the generator that is associated with the engine and further to provide the engine head with ducts that establish communication between the piston valve cylinders and the chambers within the pumping cylinders and said head being provided with ducts that form common clearance chambers between the respective members of the pairs of combustion cylinders.

With the foregoing and other objects in view, my invention consists in certain novel features of construction and arrangement of parts that will be hereinafter more fully described and claimed and illustrated in the accompanying drawings in which:

Figure 1 is a side elevational view of an engine of my improved construction.

Figure 2 is an elevational view of the engine with the crank case thereof in section and showing the crank in elevation.

Figure 3 is a vertical section taken lengthwise through the head of my improved engine.

Figure 4 is a vertical section taken approximately on the line 4—4 of Figure 1.

Figure 5 is a horizontal section taken approximately on the line 5—5 of Figure 4.

Figure 6 is a vertical section taken on the line 6—6 of Figure 4.

My improved engine includes six cylinders arranged in a row and with their axes all occupying the same plane. The members 10 forming the central pair of cylinders, function as pumping cylinders, while the members 11 and 12 at the ends of the row function as combustion cylinders. These cylinders may be separately formed, or, as shown, they may be cast en bloc and the upper portions of the walls of said cylinders may be formed with communicating chambers 13, through which may be circulated a fluid cooling medium, such as water.

The six cylinders surmount a suitable formed crank case 14, that is provided with bearings 15 for a crank shaft 16, and the latter being provided with four cranks 17, 18, 19 and 20. Cranks 17 and 18 are arranged 180 degrees apart, or directly opposite to each other, and crank 17 is located beneath one pair of the combustion cylinders 11 and 12, while crank 18 is located beneath the other pair of combustion cylinders.

Cranks 19 and 20 are located between the cranks 17 and 18 and beneath the pumping cylinders 10. These cranks 19 and 20 are arranged 180 degrees apart and crank 19 occupies an angular position of approximately 135 degrees in advance of crank 17 in the direction of crank rotation, while crank 20 occupies an angular position of approximately 135 degrees to the rear of crank 18 in the direction of crank rotation.

The pistons 21 that operate in the combustion cylinders 11 and 12, above crank 17, are connected to said crank 17 by connecting rods 22 and the pistons 23 that operate in the combustion cylinders above crank 18, are connected to the latter by connecting rods 24.

Pumping pistons 25 that operate within the pumping cylinders 10, are connected respectively to cranks 19 and 20 by connecting rods 26.

Arranged on the upper ends of the cylinders, is a head block 27, that is provided with connecting chambers 28, through which may be circulated a fluid cooling medium, and formed in the underside of the end portions of this block 27, are longitudinally disposed recesses 29, that serve as common clearance chambers for the members forming the respective pairs of combustion chambers.

Formed through walls that surround the outer members 12 of the pairs of combustion chambers, and the points intermediate their ends, are exhaust ports 30, and leading therefrom are exhaust pipes 31.

Formed integral with the central portion of head 27, and directly opposite to the pumping cylinders 10, is a lateral extension 32, the underside of which may be machined or finished at the same time that the underside of the head is finished, and formed in the underside of this extension and said head, are ducts or passage ways 33, that are disposed substantially at right angles to the planes occupied by the axes of the cylinders, and said ducts communicate respectively with the upper ends of the chambers of the pumping cylinders.

The outer ends of these ducts terminate in openings that are formed in the underside of the lateral extension, and secured in any suitable manner to the underside of said extension by the upper end of a separately formed casting that includes a pair of piston valve cylinders 34, the axes of which are parallel with each other and with the plane occupied by the axes of the combustion and pumping cylinders.

Formed integral with the intermediate portions of the cylinders 34 is a housing 35, having formed therein a gaseous fuel inlet chamber 36, and formed through the walls of the cylinders 34 and leading from this chamber to the chambers within the valve cylinders, are gaseous fuel inlet ports 37.

Chamber 36 is provided with an inlet opening 38, that is connected to a suitable source of gaseous fuel supply, for instance, a carburetor.

The lower portions of the cylinders 34 terminate in a suitably formed crank case 39 and journaled in suitable bearings therein is a crank 40, having two cranks 41, that are located respectively beneath the cylinders 34, and said cranks being arranged 180 degrees apart.

Piston valves 42 are arranged for operation within the cylinders 34, and said piston valves are connected to the cranks 41 by connecting rods 43.

Located on the side of the cylinder block is an ordinary electric generator 44 of the type usually employed in connection with internal combustion engines, said generator being driven directly from the crank shaft of the engine and connecting the shaft of this generator with the crank shaft 40, is a short connecting member 45, which may be provided with one or more universal joints, such as 46.

Formed in head 27 and leading outward from duct 33 on the side of the engine opposite to the side that is provided with the piston valves, are outlet openings 48, and leading from each of these openings is a downwardly inclined duct 49, the lower end thereof communicating with a series of inlet ports 50, that are formed in the wall of the adjacent combustion cylinder 11.

The inlet ports 50 are located at points in the cylinders 11 where they will be fully uncovered and open only when the pistons in said cylinders 11 are at their low centers, or at the outer ends of their stroke.

The exhaust ports 30, previously described, are located practically in the same horizontal plane with the inlet ports 50, so that said exhaust ports are open only when the pistons in cylinders 12 are at the lower or outer ends of their stroke.

Seated in head 27 and preferably at a point above each combustion cylinder 11, is an ignition device, preferably a spark plug, and the terminals of the electrodes thereof project into the corresponding common clearance chamber 29.

The operation of my improved engine is as follows:

As the pistons in each pair of combustion cylinders approach and pass high center, or the inner ends of their stroke, a spark is produced between the terminals of the electrodes of the corresponding spark plug, thereby igniting the charge of gaseous fuel that is compressed in the corresponding common clearance chamber 29, and the expansion following combustion drives the pistons downward on their power stroke. As these pistons approach low center, or the outer end of their travel, the corresponding exhaust port 30, which is slightly wider than the corresponding inlet port 50, will open, thereby permitting the products of combustion to discharge through the open port and consequently effecting a material reduction of pressure within the combustion chambers. As the piston in each chamber 11 passes low center, the corresponding inlet ports 50 are uncovered thereby admitting from the corresponding duct 49, a charge of pre-compressed gaseous fuel and the inrush of this pre-compressed charge will drive before it, through the chambers 11 and 12, and common clearance chamber 29, the burnt products of combustion, and which later will be forced out through exhaust ports 30, as long as the latter are open.

On the upward travel of the pistons in the combustion chambers, the gaseous fuel inlet ports 50 and the exhaust ports 30 will be closed and the continued upward movement of said pistons will compress the admitted charge of gaseous fuel, and whatever residual products of combustion remain in chamber 12, within the corresponding common clearance chamber 29 and the upper portions of the combustion chambers 11 and 12, and if the pistons, operating in said combustion chambers, pass their high centers, this compressed charge will be ignited as previously described and the pistons will be driven downward on their power stroke.

The generator 44 operates synchronously with crank shaft 16 and consequently the piston valve crank shaft 40 operates at the same speed as the main crank shaft.

As each piston valve 42 passes low center, the corresponding set of inlet ports 37 are uncovered, thereby admitting to the upper portion of the corresponding piston valve chamber and duct 33, a volume of gaseous fuel, and which latter is drawn into the corresponding pumping cylinder 10, as the piston 25 therein moves downward on its suction stroke.

As the piston valve starts to move upwardly, the ingress of gaseous fuel through ports 37 is cut off and the gaseous fuel drawn into duct 33, and the upper portion of the corresponding pumping cylinder 10 will be compressed in said duct and in the corresponding duct 49, as a result of the upward travel of the corresponding pumping piston 25.

As each pumping piston passes its high center, the piston in the adjacent combustion cylinder 11 passes its low center, thereby uncovering the corresponding inlet ports 50, and as a result, the charge of compressed gaseous fuel is transferred to the connected combustion cylinders.

Thus, it will be seen that I have provided a relatively simple and practical two stroke cycle internal combustion engine, having two pairs of combustion cylinders and a pair of pumping cylinders, each of the latter being arranged to supply one pair of the combustion cylinders with pre-compressed gaseous fuel, and the admission of gaseous fuel into the pumping cylinders being controlled by piston valves that are actuated by extraneous means, preferably the generator that is associated with the engine, and which arrangement provides an engine having a relatively high degree of efficiency conveyed with low cost of operation.

Obviously, the construction of the engine, as herein shown and described, may be changed and modified in certain details without departing from the spirit of my invention, the scope of which is set forth in the appended claims.

I claim as my invention:

1. In a two stroke cycle internal combustion engine, the combination with six cylinders, of a crank shaft, the six cylinders being arranged in a row parallel with the axis of said crank shaft, the two center cylinders functioning as pumping cylinders, the two pairs of end cylinders functioning as combustion cylinders, the outer or end members of each pair of combustion cylinders being provided with exhaust ports, the second combustion cylinder from each end being provided with a gaseous fuel transfer port, a cylinder head common to the six cylinders and having chambers that establish communication between the respective members of the pairs of combustion cylinders, said cylinder head having a lateral extension in which are formed passages for the inlet of gaseous fuel to the two pumping cylinders, said passages opening through the underface of the lateral extension of the cylinder head, separately formed piston valve cylinders attached to and depending from the lateral extension of the cylinder head, piston valves arranged for operation within said piston valve cylinders for controlling the admission of gaseous fuel into the inlet passages leading to the pumping cylinders and there being a transfer duct from the clearance of each pumping cylinder to the gaseous fuel transfer port of the adjacent combustion cylinder.

2. In a two stroke cycle internal combustion engine, the combination with six cylinders, of a crank shaft, the six cylinders being arranged in a row parallel with the axis of said crank shaft, the two center cylinders functioning as pumping cylinders, the two pairs of end cylinders functioning as combustion cylinders, the outer or end members of each pair of combustion cylinders being provided with exhaust ports, the inner member of each pair of combustion cylinders being provided with a gaseous fuel transfer port, a cylinder head common to the six cylinders and having chambers that establish communication between the respective members of the pairs of combustion cylinders, said cylinder head having a lateral extension in which are formed passages for the inlet of gaseous fuel to the two pumping cylinders, said passages opening through the underface of the lateral extension of the cylinder head, separately formed piston valve cylinders attached to and depending from the lateral extension of the cylinder head, piston valves arranged for operation within said piston valve cylinders for controlling the admission of gaseous fuel into the inlet passages leading to the pumping cylinders, there being a transfer duct from the clearance of each pumping cylinder to the gaseous fuel transfer port of the adjacent combustion cylinder, pistons arranged for operation within the pumping and combustion cylinders, connections from said pistons to the crank shaft and means for actuating the piston valves in proper time relation to the strokes of the pistons in the pumping cylinders.

3. In a two stroke cycle internal combustion engine, a series of six cylinders arranged in a row, the two center cylinders functioning as pumping cylinders to supply pre-compressed gaseous fuel to the two pair of end cylinders which latter function as combustion cylinders, piston valve cylinders disposed laterally of the pumping cylinders for controlling the admission of gaseous fuel to said pumping cylinders, a cylinder head common to all the pumping, combustion and piston valve cylinders and said head being provided with common clearance chambers that connect the respective members of the pairs of combustion cylinders and with common clearance chambers that connect the respective piston valve cylinders with the adjacent pumping cylinders.

4. In a two stroke cycle internal combustion engine, the combination with a series of six cylinders arranged in a row, of a crank shaft, pistons arranged for operation within said cylinders and connected to said crank shaft, the two center cylinders functioning as pumping cylinders, the two pairs of end cylinders functioning as combustion cylinders, transfer ducts leading from the upper portions of the pumping cylinders to the intermediate portions of the immediately adjacent combustion cylinders, the outer members of the pairs of combustion cylinders being provided with exhaust ports, piston valve cylinders arranged laterally of the pumping cylinders, a common head for said pumping, combustion and piston valve cylinders, the members of each pair of combustion cylinders being connected by a common clearance chamber that is formed in said head, each piston valve cylinder being connected to the adjacent pumping cylinder by a common clearance chamber that is formed in said head, pistons arranged for operation within the pumping and combustion cylinders, a crank shaft to which said pistons are connected, piston valves arranged for operation within said piston valve cylinders and a crank shaft to which said piston valves are connected.

In testimony whereof I affix my signature.

EVERETT R. BURTNETT.